(12) United States Patent
Anoszko et al.

(10) Patent No.: US 8,945,267 B2
(45) Date of Patent: *Feb. 3, 2015

(54) COLLAPSIBLE EXTENDED SURFACE FILTER AND AIR CLEANER SYSTEM USING COLLAPSIBLE EXTENDED SURFACE FILTER

(71) Applicant: Research Products Corporation, Madison, WI (US)

(72) Inventors: Thomas J. Anoszko, Verona, WI (US); John R. Genova, Verona, WI (US)

(73) Assignee: Research Products Corporation, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,933

(22) Filed: May 6, 2014

(65) Prior Publication Data

US 2014/0237967 A1 Aug. 28, 2014

Related U.S. Application Data

(63) Continuation of application No. 14/095,034, filed on Dec. 3, 2013, which is a continuation of application No. 13/692,778, filed on Dec. 3, 2012, now Pat. No. 8,623,109, which is a continuation of application No.

(Continued)

(51) Int. Cl.
*B01D 46/00* (2006.01)
*B01D 46/10* (2006.01)
*B01D 46/52* (2006.01)

(52) U.S. Cl.
CPC ........ *B01D 46/0006* (2013.01); *B01D 46/0005* (2013.01); *B01D 46/0016* (2013.01); *B01D 46/10* (2013.01); *B01D 46/521* (2013.01); *B01D 46/523* (2013.01); *Y10S 55/31* (2013.01)
USPC .................. 55/496; 55/481; 55/497; 55/511; 55/521; 55/DIG. 31

(58) Field of Classification Search
CPC .......... B01D 46/0005; B01D 46/0006; B01D 46/0016; B01D 46/10; B01D 46/521; B01D 2275/203
USPC ........... 55/481, 496, 497, 502, 506, 511, 521, 55/DIG. 31
See application file for complete search history.

(56) References Cited

U.S. PATENT DOCUMENTS 3,494,113 A 2/1970 Kinney
4,537,812 A 8/1985 Elbers
(Continued)

OTHER PUBLICATIONS

USPTO Nonfinal Office Action dated Jun. 27, 2011, U.S. Appl. No. 12/347,603.
(Continued)

*Primary Examiner* — Robert Clemente
(74) *Attorney, Agent, or Firm* — Boardman & Clark LLP

(57) ABSTRACT

A collapsible air cleaner filter is provided. The filter includes a pleated media filter having a first end, a second end, and a filter media extending between the first and second ends, wherein the filter media includes a first plurality of flexible end portions and a second plurality of flexible end portions, the first and second plurality of flexible end portions are separated by a plurality of pleats, and the filter media extends a first length between the first and second plurality of flexible end portions, and an end member coupled to the first end of the pleated media filter, the end member extending a second length parallel to the first length, the first length being greater than the second length.

20 Claims, 12 Drawing Sheets

Related U.S. Application Data

13/348,543, filed on Jan. 11, 2012, now Pat. No. 8,414,674, which is a continuation of application No. 12/347,603, filed on Dec. 31, 2008, now Pat. No. 8,157,881.

(60) Provisional application No. 61/017,877, filed on Dec. 31, 2007.

(56) References Cited

U.S. PATENT DOCUMENTS

| | | | |
|---|---|---|---|
| 5,071,555 | A | 12/1991 | Enbom |
| 5,167,740 | A | 12/1992 | Michaelis et al. |
| 5,252,111 | A | 10/1993 | Spencer et al. |
| 5,273,563 | A | 12/1993 | Pasch et al. |
| 5,273,564 | A | 12/1993 | Hill |
| 5,531,892 | A | 7/1996 | Duffy |
| 5,743,927 | A | 4/1998 | Osendorf |
| 5,840,094 | A | 11/1998 | Osendorf et al. |
| 5,944,860 | A | 8/1999 | Mack et al. |
| 5,958,097 | A | 9/1999 | Schlör et al. |
| 5,989,303 | A | 11/1999 | Hodge |
| 6,126,708 | A | 10/2000 | Mack et al. |
| 6,152,980 | A | 11/2000 | Culwell |
| 6,165,240 | A | 12/2000 | Hodge |
| 6,264,713 | B1 | 7/2001 | Lewis, II |
| 6,319,300 | B1 | 11/2001 | Chen |
| 6,398,839 | B2 | 6/2002 | Choi et al. |
| 6,464,745 | B2 | 10/2002 | Rivera et al. |
| 6,485,538 | B1 | 11/2002 | Toyoshima |
| 6,592,643 | B2 | 7/2003 | Shah et al. |
| 6,599,343 | B2 | 7/2003 | Fredrick et al. |
| 6,638,333 | B2 | 10/2003 | Schuld et al. |
| 6,652,613 | B2 | 11/2003 | Shah et al. |
| 6,723,150 | B2 | 4/2004 | Parker |
| 6,814,773 | B2 | 11/2004 | Shah et al. |
| 6,833,017 | B2 | 12/2004 | Quigley |
| 6,860,916 | B2 | 3/2005 | Kubokawa et al. |
| 6,941,630 | B2 | 9/2005 | Wynn |
| 6,955,702 | B2 | 10/2005 | Kubokawa et al. |
| 7,004,989 | B2 | 2/2006 | Karlsson |
| 7,037,354 | B1 | 5/2006 | Dimicelli |
| 7,077,921 | B1 | 7/2006 | Dimicelli |
| 7,252,696 | B2 | 8/2007 | Jenkins et al. |
| 7,452,396 | B2 | 11/2008 | Terlson et al. |
| 7,497,888 | B2 | 3/2009 | Ashwood et al. |
| 7,537,630 | B2 | 5/2009 | Schuld et al. |
| 7,758,667 | B2 | 7/2010 | Ashwood et al. |
| 7,959,699 | B2 | 6/2011 | Privitt et al. |
| 8,157,881 | B1 | 4/2012 | Anoszko et al. |
| 8,182,571 | B2 | 5/2012 | Kailani |
| 8,414,674 | B2 | 4/2013 | Anoszko et al. |
| 8,623,109 | B2 | 1/2014 | Anoszko et al. |
| 2003/0159415 | A1 | 8/2003 | Parker |
| 2004/0182055 | A1 | 9/2004 | Wynn |

OTHER PUBLICATIONS

Response to Jun. 27, 2011 Nonfinal Office Action filed Sep. 27, 2011, U.S. Appl. No. 12/347,603.

USPTO Final Office Action dated Nov. 16, 2011, U.S. Appl. No. 12/347,603.

Response to Nov. 16, 2011 Final Office Action filed Dec. 21, 2011, U.S. Appl. No. 12/347,603.

USPTO Nonfinal Office Action dated Apr. 17, 2012, U.S. Appl. No. 13/348,543.

Response to Apr. 17, 2012 Nonfinal Office Action filed Jul. 17, 2012, U.S. Appl. No. 13/348,543.

USPTO Nonfinal Office Action dated Sep. 6, 2012, U.S. Appl. No. 13/348,543.

USPTO Nonfinal Office Action dated May 7, 2013, U.S. Appl. No. 13/692,778.

Response to May 7, 2013 Nonfinal Office Action filed Sep. 9, 2013, U.S. Appl. No. 13/692,778.

USPTO Nonfinal Office Action dated Nov. 13, 2013, U.S. Appl. No. 13/692,778.

USPTO Notice of Allowability dated Nov. 21, 2013, U.S. Appl. No. 13/692,778.

"Defendants' Invalidity Contentions Under 35 USC §§ 102 and 103," regarding US Patent Nos. 8,157,881, 8,414,674 and 8,623,109, filed Aug. 11, 2014 in the U.S. District Court for the Western District of Wisconsin, in the case of Research Products Corporation v. R.P.S. Products, Inc., et al., Civil Action No. 3:14-cv-00101-wmc.

COLLAPSIBLE EXTENDED SURFACE FILTER AND AIR CLEANER SYSTEM USING COLLAPSIBLE EXTENDED SURFACE FILTER

CROSS-REFERENCE TO RELATED APPLICATIONS

This application claims priority as a continuation application of U.S. application Ser. No. 14/095,034 filed Dec. 3, 2013, which is a continuation of U.S. application Ser. No. 13/692,778, now U.S. Pat. No. 8,623,109, filed Dec. 3, 2012, which is a continuation application of U.S. application Ser. No. 13/348,543, now U.S. Pat. No. 8,414,674, filed Jan. 11, 2012, which is a continuation application of U.S. application Ser. No. 12/347,603, now U.S. Pat. No. 8,157,881, filed Dec. 31, 2008, which claims the benefit of U.S. Provisional Patent Application 61/017,877, filed Dec. 31, 2007, the contents of which are hereby incorporated by reference in their entirety.

BACKGROUND OF THE INVENTION

1. Field of the Invention

This invention is directed to air cleaner assemblies incorporated into forced air HVAC systems.

2. Related Art

Air cleaner assemblies for forced air heating, cooling and ventilation (HVAC) systems have been used for decades. Such air filtration devices and structures vary widely from simple panel filters to two substantially different types of air cleaners: electronic air cleaners and extended surface pleated mechanical media filters. Extended surface filters can be supplied in a collapsible configuration or in a cartridge configuration. Within the broad class of media filters, there is a wide range of filter media and structures. At one end of the conventional range of media filters are the relatively low-efficiency fiberglass or spun glass panel filters. These filters use a weave or felt of glass fibers to trap airborne particulates and the like. Typically, such fiberglass mat filters have an American Society of Heating Air Conditioning and Refrigeration Engineers (ASHRAE) average Arrestance of 50-60%, per Standard 52.1. Such filters are typically one or two inches thick. Pleated media filters are a step up from basic fiberglass mat filters. Such pleated media filters are typically thin synthetic or glass fiber sheets and typically have ASHRAE MERV ratings from 6-16, per Standard 52.2.

HVAC systems can use in-duct air cleaners. Such in-duct air cleaners include a frame or filter housing that connects to the inflow and/or outflow portions of the duct work and an opening that allows a filter to be inserted and removed from the air cleaner. Typically, the in-duct air cleaner is designed for a specific type and size of filter. The in-duct air cleaner typically includes a door or other panel that closes the opening of the filter housing through which the filter is inserted and removed from the in-duct air cleaner.

SUMMARY OF THE DISCLOSED EMBODIMENTS

Collapsible extended surface pleated mechanical media (ESPM) filters occupy substantially less space in their collapsed state, compared to equivalent cartridge configurations. Thus, they are easier to store and ship, and consequently have lower storage and shipping costs. However, collapsible ESPM filters are substantially less user-friendly than equivalent cartridge-style filters, which can be easily inserted into and removed from the filter housing with only minimal user interaction.

In contrast, collapsible ESPM filters can require substantial assembly by the end user before they are ready to be installed into the filter housing. For example, one such air cleaner design manufactured and sold by Research Products Corporation includes an inner housing, pleat spacers, an outer housing and a door. The ESPM filters for this air cleaner are sold in a collapsed state. Before the collapsible ESPM filter can be installed, it must be opened up and assembled into the inner housing. The pleat spacers are then installed into the inner housing and inserted into the opened ESPM filter to hold open the pleats. This adds significantly to the installation time and difficulty. The inner housing, ESPM filter and pleat spacers assembly is then installed into the outer housing. The outer housing and door have seals that provide a seal around the inner housing. This design has redundant sealing surfaces and many parts to install and is time consuming and labor intensive to install.

Other collapsible ESPM filters are effectively collapsible cartridge filters, in that they include components that, when assembled, act like the cartridge housing of a cartridge-style filter. Companies having such products include Honeywell, with its Pop-Up filter products and Carrier, with its EZ-Flex filter products. The Honeywell Pop-Up product comprises multiple molded plastic parts that are hinged and suspended on elastic cords that "Pop" into position to form a cartridge. The filter of the Carrier EZ-Flex product opens up like an accordion. Front and back panels snap on the opened filter to form a cartridge. Both of these designs have front and back panels forming a seal on the ends of the pleats. When these filters are installed into a housing, additional seals are required between the front and back panels and the front and back walls of the housing. These seals represent additional parts and design complexity.

This invention provides an in-duct air cleaner having an easy-to-install collapsible extended surface pleated media filter.

This invention separately provides an in-duct air cleaner having a housing, where the collapsible extended surface pleated media filter effectively self-seals against the front and rear walls of the housing.

This invention separately provides an in-duct air cleaner housing having support members for a collapsible extended surface pleated media filter.

This invention separately provides an in-duct air cleaner having an enclosing structure, where the collapsible extended surface pleated media filter has end members that form an effective seal against the top and bottom walls of the enclosing structure.

This invention separately provides an in-duct air cleaner having support members for a collapsible extended surface pleated media filter.

In various exemplary embodiments of air cleaners according to this invention, an air cleaner comprises an enclosing structure having an air inlet surface, an air outlet surface, and at least one filter-opening surface. In various exemplary embodiments, the enclosing structure of the air cleaner includes support members or the like provided adjacent to, but spaced a given distance from, the top and bottom walls of the enclosing structure. A collapsible extended surface pleated media filter has a pair of end members and a mechanical media filter that extends between the end members and is pleated.

The end members have an inner surface that the pleated mechanical media filter is attached to, and outer surface facing away from the pleated mechanical media filter. The end members have a given thickness and a given length that are appropriate for the particular enclosing structure the collapsible extended surface pleated media filter is to be used with. In various exemplary embodiments, the thickness of the end members is based on the distance of the support surfaces from the top and bottom walls of the enclosing structure. In various exemplary embodiments, the end members have a seal structure provided on the outer surface that interacts with the top or bottom wall of the enclosing structure to provide an effective seal against air flowing around, rather than through, the collapsible extended surface pleated media filter.

In various exemplary embodiments, the mesh members have a width that is at most equal to the length of the end members. In various exemplary embodiments, the pleated mechanical media filter has a width that is greater than the length of the end members and/or width of the mesh members. In such exemplary embodiments, the pleated mechanical media filter typically extends beyond both ends of the mesh and/or end members. In various other exemplary embodiments, a plurality of the flexible material strips extend between the end members, with at least one flexible material strip located near, but spaced from, one or both of the side edges of the pleated mechanical media filter. In such exemplary embodiments, the pleated mechanical media filter extends beyond those flexible material strips and/or the ends of the end members.

To install a collapsible extended surface pleated media filter into the enclosing structure, the collapsible extended surface pleated media filter, if it is in a collapsed state, is expanded to an open state, typically by pulling apart the end members. The opened collapsible extended surface pleated media filter is then inserted into the enclosing structure by inserting the end members of the collapsible extended surface pleated media filter into the spaces between the support members and the top or bottom walls of the enclosing structure. In various exemplary embodiments, the length of the end members is substantially equal to the depth of the enclosing structure between side surfaces of the enclosing structure, while the width of the pleated mechanical media filter is greater than the depth of the enclosing structure and the lengths of the end members and/or flexible support members. As a result, a first portion of the width of the pleated mechanical media filter that extends beyond the ends of the end members adjacent to a back surface of the enclosing structure interacts with the back surface. Typically, that first portion of the pleated mechanical media filter provides an effective seal between the collapsible extended surface pleated media filter and the back surface against air flowing around, rather than through, the collapsible extended surface pleated media filter.

Likewise, when a door or the like of the air cleaner is installed into a filter opening in the enclosing structure, the collapsible extended surface pleated media filter is held in the enclosing structure such that a second portion of the width of the pleated mechanical media filter that extends beyond the ends of the end members adjacent to the door interacts with the door. Typically, that second portion of the pleated mechanical media filter provides an effective seal between the collapsible extended surface pleated media filter and the door against air flowing around, rather than through, the collapsible extended surface pleated media filter. Accordingly, the collapsible extended surface pleated media filter fits into the enclosing structure such that air passing through the air inlet surface, substantially and entirely passes through the collapsible extended surface pleated media filter, and then passes out through the air outlet surface.

In various exemplary embodiments, the width of the pleated mechanical media filter may be approximately equal to or slightly shorter than the depth of the enclosing structure, such that the pleated mechanical media filter just contacts, or is even spaced a small distance away from, one or both of the side surfaces of the enclosing structure. In still other exemplary embodiments, the first and second ends of the pleated mechanical media filter interact differently with the side surfaces of the enclosing structure. That is, one of the first and second ends extends substantially beyond the end of the end members, such that that first or second end of the pleated mechanical media filter is pressed against the adjacent side surface of the enclosing structure. At the same time, the other of the first and second ends just contacts or is spaced a sufficiently small distance from that other adjacent side surface. In both cases, the interaction of the ends of the pleated mechanical media filter with the side surfaces of the enclosing structure creates an effective seal such that the airflow through the enclosing structure substantially passes through the pleated mechanical media filter rather than passing between the pleated mechanical media filter and the side surfaces.

In various exemplary embodiments of methods for using the collapsible extended surface pleated media filter according to this invention, a used filter extending between the support members is removed from the support structure and discarded. A new collapsible extended surface pleated media filter is removed from its packaging and expanded by pulling apart the end members. The end members are then inserted through a filter opening of the enclosing structure and into the spaces between the support members and the top and bottom walls, such that the end members form an effective seal with the top and bottom walls of the enclosing structure against air flowing around, rather than through, the collapsible extended surface pleated media filter. The collapsible extended surface pleated media filter is pushed into the enclosing structure such that a first portion of the pleated mechanical media filter is substantially adjacent to or contacts the back side surface of the enclosing structure to create an effective seal against air flowing around, rather than through, the collapsible extended surface pleated media filter. A door is then attached to the enclosing structure, such that a second portion of the pleated mechanical media filter is substantially adjacent to or contacts the door to create an effective seal against air flowing around, rather than through, the collapsible extended surface pleated media filter.

In various exemplary embodiments, the collapsible extended surface pleated media filter optionally includes one or more flexible support members or the like on or in the pleated mechanical media filter. The flexible support members act to assist in keeping the pleats of the collapsible extended surface pleated media filter open. The flexible support members can be metal or formed of any other appropriate material. In various exemplary embodiments, the flexible support members are mesh members. In various other exemplary embodiments, the flexible support members are long, relatively narrow strips of flexible material. The flexible support members can be placed adjacent to one or both of the outer surfaces of the pleated mechanical media filter, and/or can be embedded within the pleated mechanical media filter.

In various exemplary embodiments, the mesh members have a width that is generally equal to the length of the end members. In various exemplary embodiments, the pleated mechanical media filter has a width that is greater than the length of the end members and/or width of the mesh members. In such exemplary embodiments, the pleated mechanical media filter typically extends beyond both ends of the mesh members and/or end members. In various other exemplary embodiments, a plurality of the flexible material strips extend between the end members, with at least one flexible material strip located near, but spaced from, one or both of the side edges of the pleated mechanical media filter. In such exemplary embodiments, the pleated mechanical media filter extends beyond those flexible material strips and/or the ends of the end members.

These and other features and advantages of various exemplary embodiments of systems and methods according to this invention are described in, or are apparent from, the following detailed descriptions of various exemplary embodiments of systems, methods and devices according to this invention.

BRIEF DESCRIPTION OF DRAWINGS

Various exemplary embodiments of systems, methods and devices according to this invention will be described in detail, with reference to the following figures, wherein.

DETAILED DESCRIPTIONS OF EXEMPLARY EMBODIMENTS

The following detailed description of various exemplary embodiments of in-duct air cleaners and collapsible extended surface pleated media filters according to this invention are described relative to a collapsible extended surface pleated media filter having end structures and flexible support members (if provided) having the same general length, with the wider pleated mechanical filter media extending beyond the ends of the end structures and beyond any flexible support members provided on or relative to the pleated mechanical filter media. It should be appreciated that the length of the end structures and the width of the flexible support members need not be the same. It should be appreciated that, in such exemplary embodiments, the pleated mechanical filter media may extend beyond only one of the end structures and/or any provided flexible support member(s).

The following detailed description discusses exemplary embodiments where the enclosing structure is a frame having a top wall, bottom wall, rear wall and an opening for inserting the filter. The in-duct air cleaners and collapsible extended surface pleated media filters according to this invention do not require this, or any, specific enclosing structure. For example, the enclosing structure could be a segment of ductwork with at least one filter-opening surface through which a collapsible extended surface pleated media filter can be installed. Alternatively, the enclosing structure can be a separate housing or frame or the like. It should be appreciated that the enclosing structure can be any structure that can be installed in the path of the airflow or any other structure capable of directing airflow largely through the collapsible extended surface pleated media filter, and that is capable of maintaining the collapsible extended surface pleated media filter in position relative to the airflow. The following detailed description assumes the opening is one vertically-oriented surface, and defines the "top", "bottom" and "rear" walls accordingly. It should be appreciated that the opening could instead be provided on a horizontally-oriented surface, with the various walls rotated accordingly.

Figure 1:
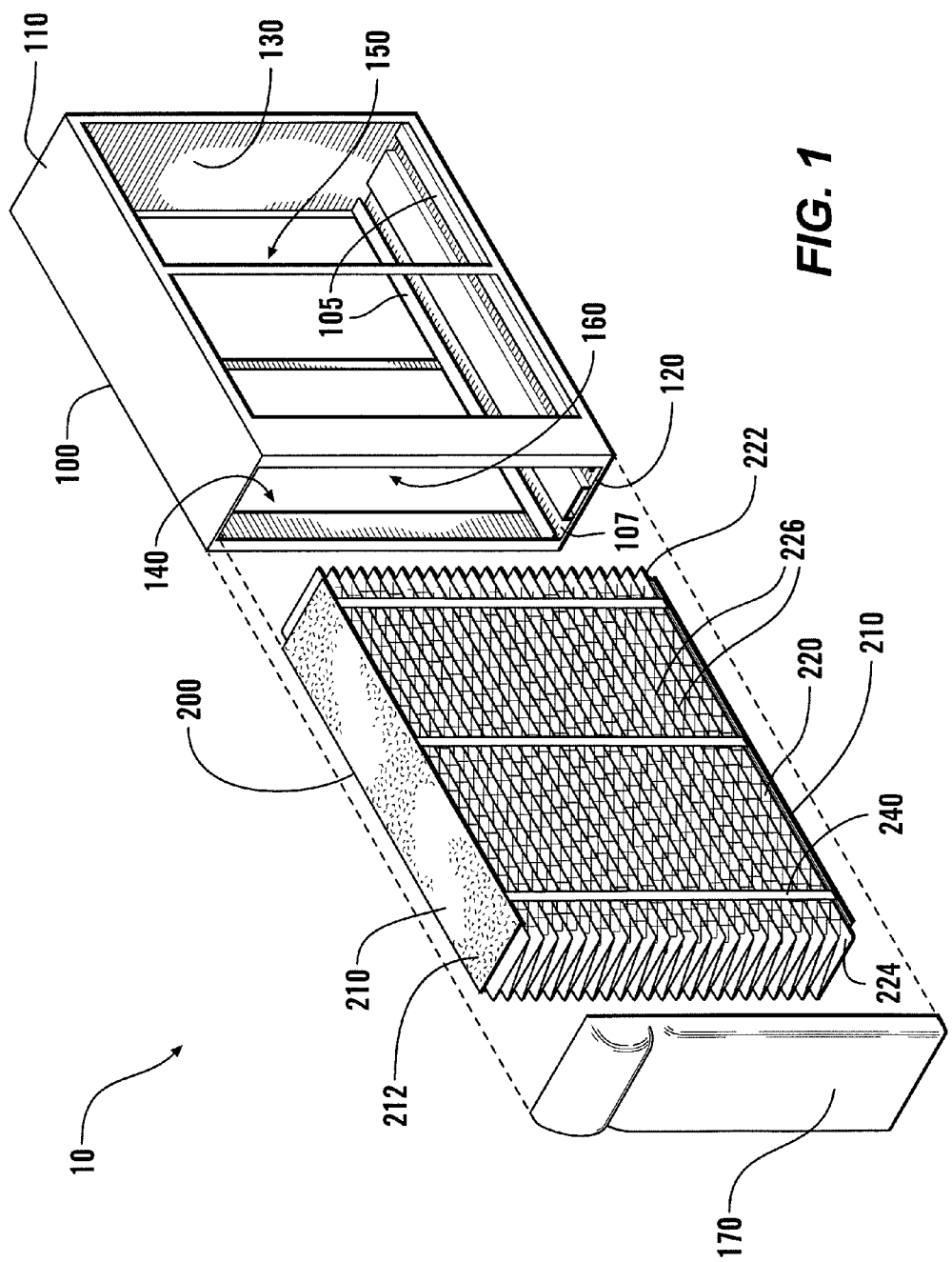
FIG. 1 is an isometric exploded view of a first exemplary embodiment of a frame and a first exemplary embodiment of a collapsible extended surface pleated media filter according to this invention.

FIG. 1 is an isometric exploded view of a first exemplary embodiment of an in-duct air cleaner 10 according to this invention. As shown in FIG. 1, the air cleaner 10 comprises a frame 100, as an enclosing structure, and a first exemplary collapsible extended surface pleated media filter 200. As shown in FIG. 1, the frame 100 has a top wall 110, a bottom wall 120 and a rear wall 130. In place of the other walls, the frame 100 defines an air inlet surface 140, an air outlet surface 150, and a filter-opening surface 160. A door 170 is attachable to the frame 100 to close the filter-opening surface 160. The air inlet and outlet surfaces 140 and 150 are connected to an air outflow portion of the duct work and an air inflow portion of the duct work, respectively, of an HVAC system. It should be appreciated that, in the exemplary embodiment shown in FIGS. 1-6, a single filter-opening surface 160 and a single door 170 are provided. In various other exemplary embodiments, alternate and/or additional filter-opening surfaces 160 and doors 170 can be provided in place of the top wall 110, the bottom wall 120 and/or the rear wall 130.

As shown in FIG. 1, the first exemplary collapsible extended surface pleated media filter 200, when in an extended or open state, is insertable into the frame 100 such that the first exemplary collapsible extended surface pleated media (CESPM) filter 200 extends between the top and bottom walls 110 and 120 and between the rear wall 130 and the filter-opening surface 160. Consequently, when the filter-opening surface 160 is closed by the door 170, air flowing into the air cleaner 10 through the air inlet surface 140 preferentially passes through the first exemplary collapsible extended surface pleated media filter 200 before exiting through the air outlet opening 150.

Figure 2:
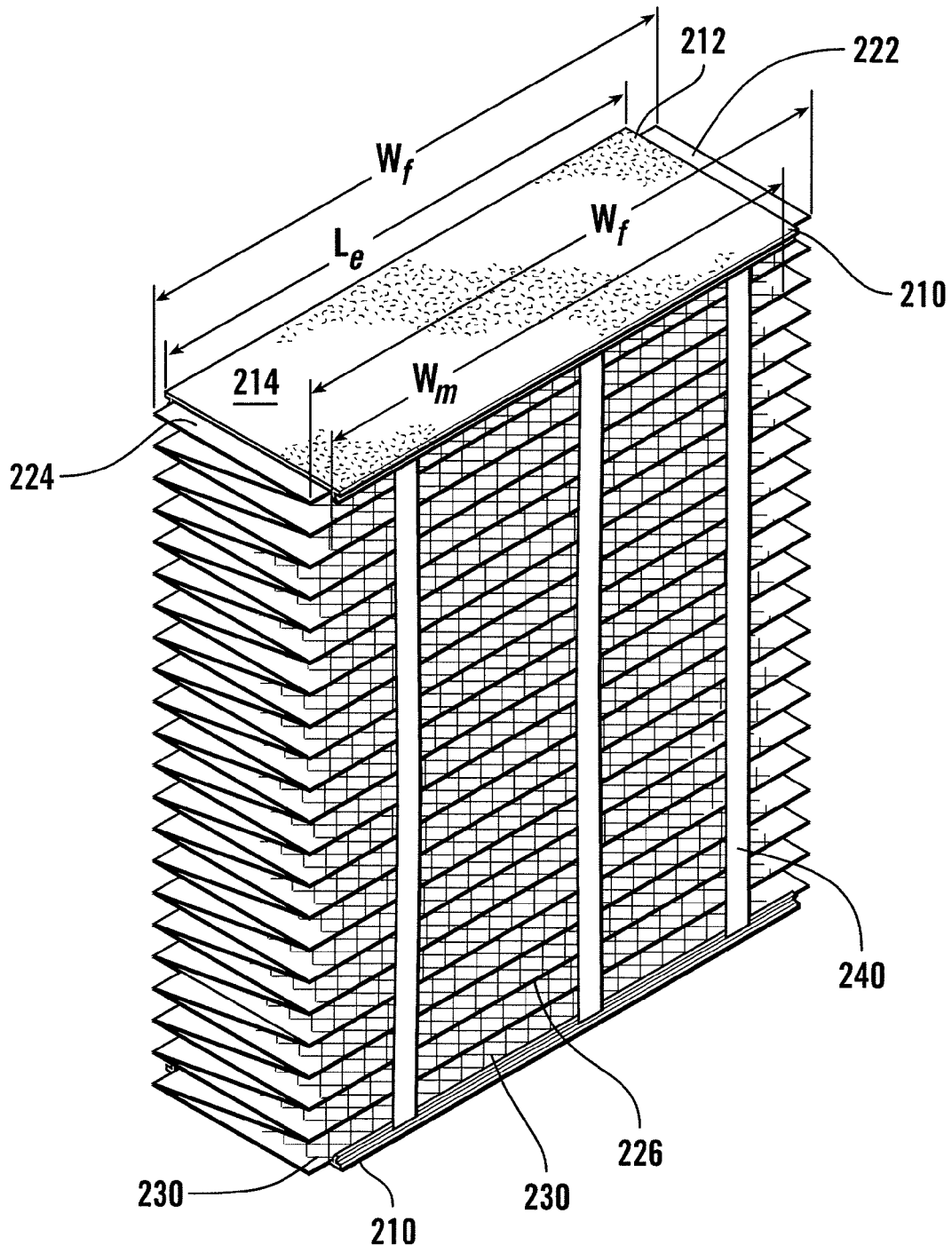
FIG. 2 is an isometric view of the first exemplary embodiment of the collapsible extended surface pleated media filter shown in FIG. 1.

FIG. 2 is an isometric view of the first exemplary collapsible extended surface pleated media filter 200 shown in FIG. 1. As shown in FIG. 1, and as shown in greater detail in FIG. 2, the first exemplary collapsible extended surface pleated media filter 200 includes a set of end members or structures 210 and an extendible pleated mechanical media filter 220. In this exemplary embodiment, at least one flexible support member 230 is optionally placed in or on the pleated mechanical media filter 220, although the at least one flexible support member 230 can be omitted if desired. The one or more flexible support members 230 at least help support the first exemplary collapsible extended surface pleated media filter 200 in its extended state. In the exemplary embodiment shown in FIGS. 1-6, the flexible support members 230 are implemented as mesh members 230. At least one pleat spacer member 240 extends along the pleat edges 226 of the pleated mechanical media filter 220 between the end members or structures 210. The pleat spacer member(s) 240 are attached to the pleat edges 226, such as, for example, using an adhesive or by sonically welding the pleat spacer member(s) 240 to the pleat edges 226. The pleat spacer member(s) 240 can also act as flexible support members in place of or in addition to the flexible support members 230.

It should be appreciated that, in the exemplary embodiment shown in FIGS. 1-6, a single end member or structure 210 is attached to each end of the pleated mechanical media filter 220. In various other exemplary embodiments, two or more end members or structures 210 can be attached to, or formed using, each end of the pleated mechanical media filter 220, with the end members or structures 210 arranged along the top and bottom edges of the pleated mechanical media filter 220. In yet other exemplary embodiments, one end of the pleated mechanical media filter 220 can be provided with a single end member or structure 210, while the other end of the pleated mechanical media filter 220 can be provided with two or more end members or structures 210. In yet other exemplary embodiments, rather than implementing the end members or structures 210 as separate elements, the end members or structures 210 are formed at least in part by combining a number of the pleats of the pleated mechanical media filter 220 together as a unit. Such end members or structures 210 similarly interact with the top and bottom walls 110 and 120 to create an effective seal.

In the exemplary embodiment shown in FIGS. 1-6, the pleated mechanical media filter 220 is a mat of synthetic fibers, while the mesh members 230, if implemented, are made of metal wire. It should be appreciated that the pleated mechanical media filter 220 can be formed using any known or later-developed material, including synthetic fiber non-woven sheets, glass fiber non-woven sheets, combined synthetic and glass fiber non-woven sheets, natural fiber non-woven sheets, combinations of such sheets, and the like.

Figure 3:
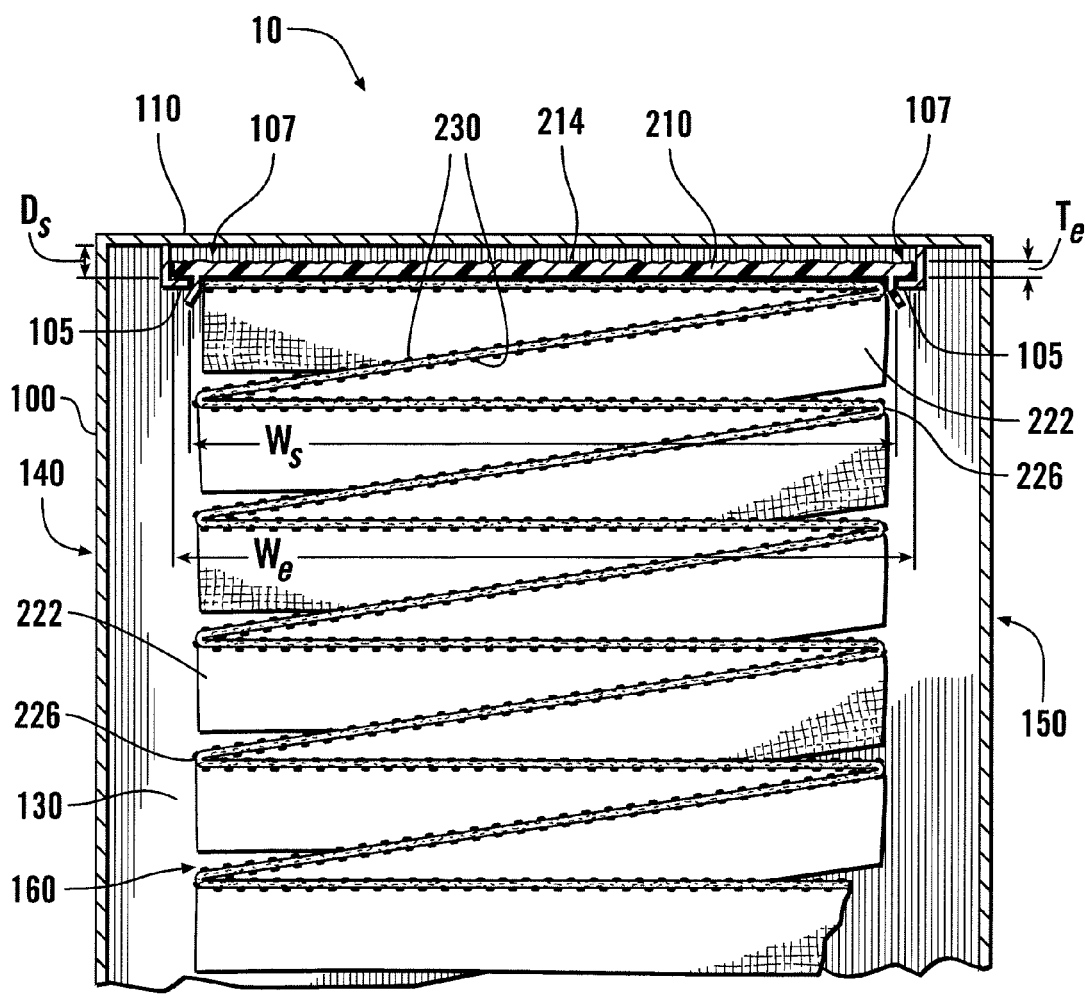
FIG. 3 is a front plan view of the first exemplary embodiment of the frame and the first exemplary embodiment of the collapsible extended surface pleated media of FIG. 1 showing the support members adjacent to the top wall of the frame.

FIG. 3 is a front plan view of the air cleaner 10 of FIG. 1 showing the support members 105 adjacent to the top wall 110 of the frame 100. As shown in FIG. 1, and as shown in greater detail in FIG. 3, the frame 100 has a first set of support members 105 located adjacent to the top wall 110 and extending between the rear wall 130 and the filter-opening surface 160 generally parallel to the air inlet and outlet surfaces 140 and 150. Likewise, a second set of support members 105 are located adjacent to the bottom wall 120 and extending between the rear wall 130 and the filter-opening surface 160 generally parallel to the air inlet and outlet surfaces 140 and 150. It should be appreciated that the support members 105 do no need to contact the rear wall 130 and/or the door 170, and do not need to be continuous as they extend between the rear wall 130 and the filter opening surface 160. In the first exemplary embodiment shown in FIG. 3, the sets of support members 105 are spaced a desired or determined distance $D_s$ from the top and bottom walls 110 and 120, and are spaced from each other by a width $W_s$. This creates spaces 107 between the top and bottom walls 110 and 120 and the support members 105. It should be appreciated that the support members 105 can take any appropriate shape that is able to maintain the end members or structures 210 at the desired positions in the frame 100.

It should be appreciated that, as shown in FIGS. 1 and 3, the end members or structures 210 have a width $W_e$ that is greater than the width $W_s$ between the support members 105. Likewise, as shown in FIGS. 1-3, the end members or structures 210 have any thickness $T_e$ that is approximately equal to or less than the distance $D_s$ between the support members 105 and the top and bottom walls 110 and 120. As a result, when the first exemplary collapsible extended surface pleated media filter 200 is inserted into the frame 100, the end members or structures 210 are held by the support members 105 in the spaces 107.

It should be further appreciated that, while the support members 105 are shown in FIG. 3 as simple brackets with an L-shaped cross section, the support members 105 may be any suitable support features that take any desirable shape. In various other exemplary embodiments, the support features are a series of channels or grooves that interact with channels or grooves provided on the end members or structures 210. In various exemplary embodiments, the interaction between the end members or structures 210 and the support features provides a tortuous path that restricts air flow between the end members or structures 210 and the top and/or bottom walls 110 and 120 to create an effective seal.

Figure 4:
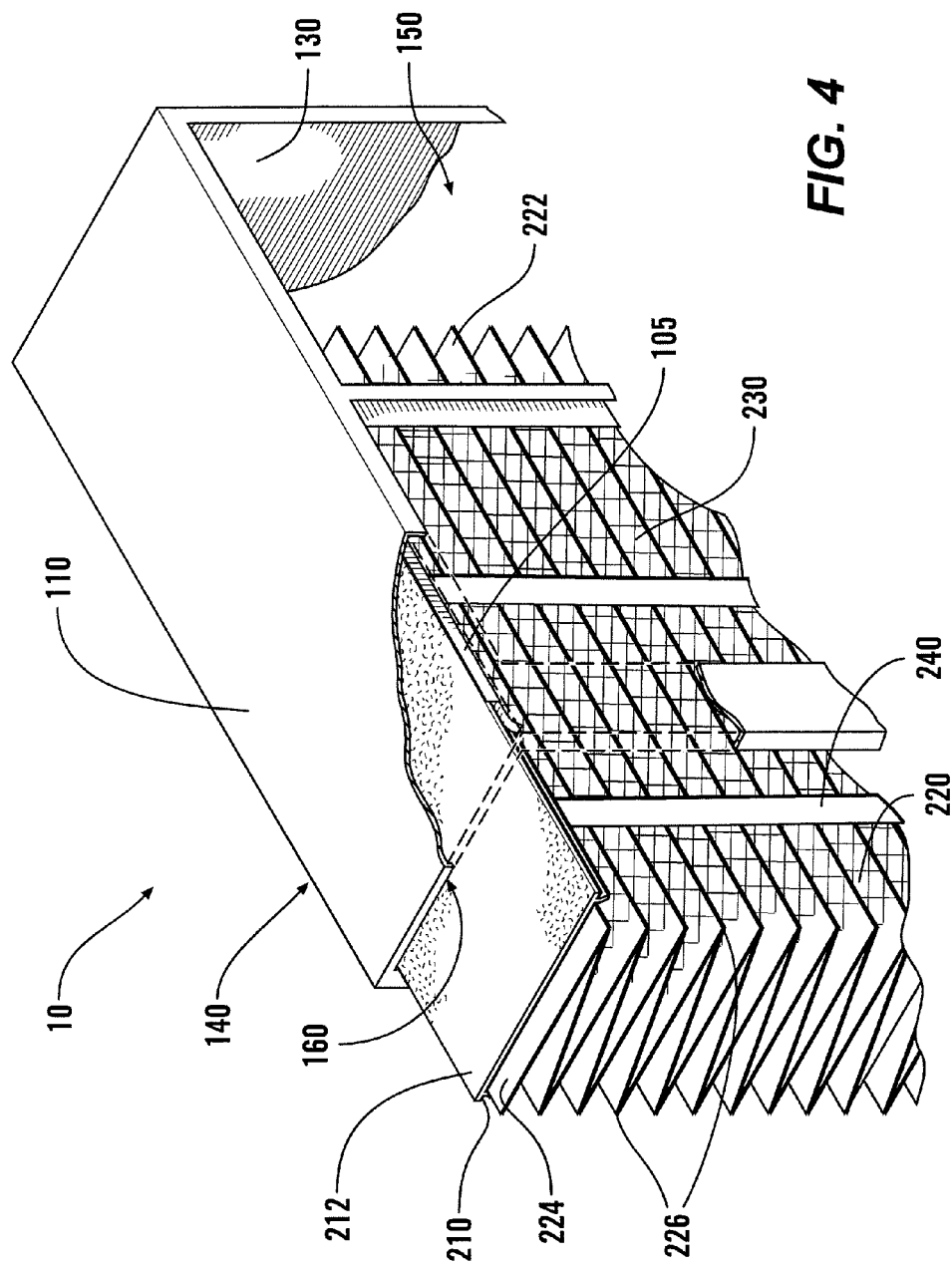
FIG. 4 is an isometric view of the first exemplary embodiment of the frame and the first exemplary embodiment of the collapsible extended surface pleated media filter shown in FIG. 1.

In the exemplary embodiment shown in FIGS. 1-6, the interaction between the support members 105 and the adjacent edges of the end members or structures 210 creates a flow path around the first exemplary collapsible extended surface pleated media filter 200 that has a flow resistance that is higher than the flow resistance through the pleated mechanical media filter 220, at least initially. Typically, the support members 105 will extend substantially the entire distance between the filter-opening surface 160 and the rear wall 130, although the support members 105 need not do so. In various other exemplary embodiments, the desired or determined distance $D_s$ and the thickness $T_e$ of the end members or structures 210 are selected so that, as shown in FIG. 4, when the first exemplary collapsible extended surface pleated media filter 200 is inserted into the frame 100, an effective seal is formed between the end members or structures 210 of the collapsible extended surface pleated media filter 200 and the top and bottom walls 110 and 120 of the frame 100.

It should be appreciated that the term "effective seal" encompasses exemplary embodiments where, at least for a new, unused first exemplary collapsible extended surface pleated media filter 200, the air flowing from the air inlet surface 140 to the air outlet surface 150 preferentially passes through the pleated mechanical media filter 220, rather than above or below it. It should be appreciated that the term "effective seal" does not necessarily mean that no air flows between either the support members 105 and the end members or structures 210 and/or the end members or structures 210 and the top and/or bottom walls 110 and/or 120.

Such exemplary embodiments include where each of the flow paths between the end members or structures 210 and the top and bottom walls 110 and 120 of the frame 100 has a flow resistance that is at least equal to the flow resistance through the pleated mechanical media filter 220, at least for a new, unused first exemplary collapsible extended surface pleated media filter 200. Such exemplary embodiments also include where each of the flow paths between the end members or structures 210 and the top and bottom walls 110 and 120 of the frame 100 has a flow inertance that is at least equal to the flow inertance through the pleated mechanical media filter 220, at least for a new, unused first exemplary collapsible extended surface pleated media filter 200.

It should be appreciated that, in various exemplary embodiments, at least an outer surface 212 of each of the end members or structures 210 of the first exemplary collapsible extended surface pleated media filter 200 can be provided with seal structure(s) 214 that help create the effective seal between the outer surfaces 212 of the end members or structures 210 and the top and bottom walls 110 and 120. It should be appreciated that the seal structure 214 can be a surface treatment, a coating, a seal member or the like that interacts with an inner surface of the top or bottom walls 110 or 120 to create or provide the effective seal. Such a surface treatment can include roughening, and the like. Such a coating can include an elastomeric layer or the like. Such a seal member can include a separate cork layer, foam layer, an elastomeric layer or the like that is adhesively attached to the outer surface 212. In various other exemplary embodiments, an effective seal may be provided by a tortuous path between the end members or structures 210, the top and/or bottom walls 110 and 120 and/or the support members 105. Such a tortuous path is usable to limit airflow between the end members or structures 210 and the bottom walls 110 and 120. The tortuous path will typically increase the flow resistance of the flow path between the end members or structures 210 and the top and/or bottom walls 110 and 120.

It should be appreciated that the top end member or structures 210 and the bottom end member or structures 210 do not have to have a seal structure, and do not need to have the same type of seal structure if the seal structure is implemented. For example, a tortuous path between the end members or structures 210 and the top and/or bottom walls 110 and 120 may provide an effective seal without the use of the seal structure. It should also be appreciated that a seal structure can be provided on the inner surfaces of one or both of the top and/or bottom walls 110 and/or 120, either in place of or in addition to the seal structure provided on the outer surfaces 212 of the end members or structures 210.

Figure 5:
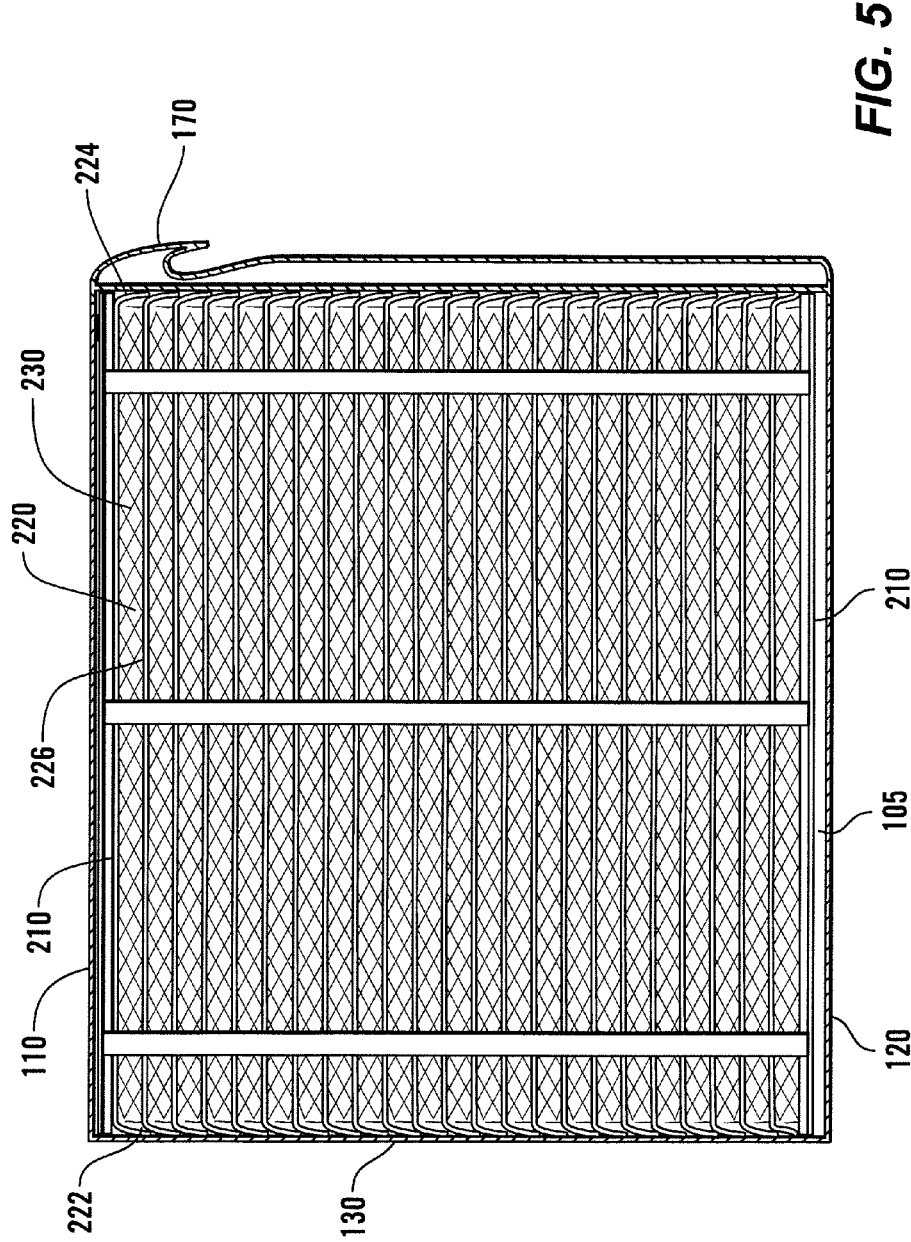
FIG. 5 is side cutaway view of the first exemplary embodiments of the frame and the extended surface pleated media filter of FIG. 1, illustrating how a first portion of the pleated mechanical filter media interacts with the rear surface of the frame and the door to form an effective seal.
Figure 6:
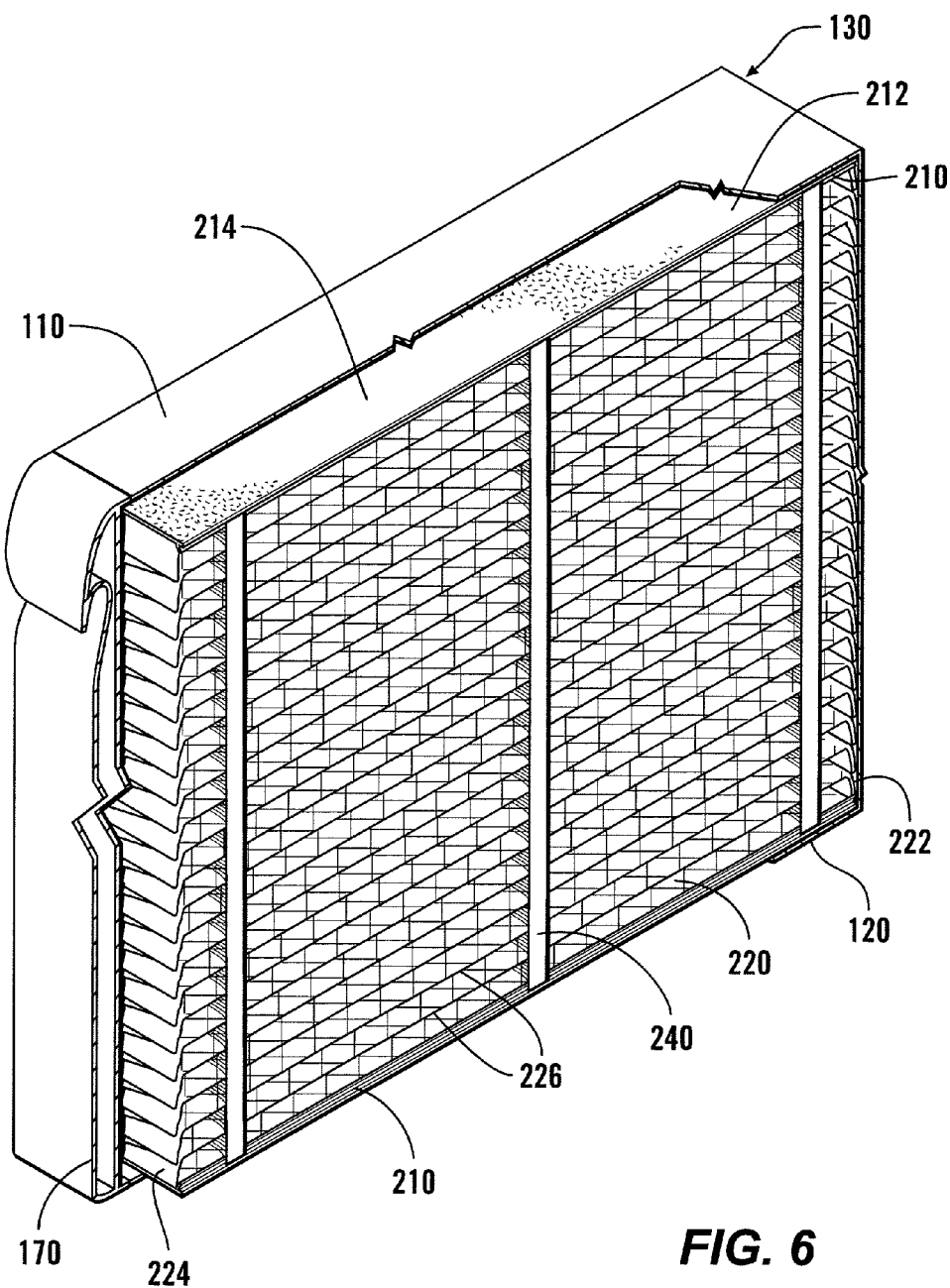
FIG. 6 is an isometric cutaway view of the first exemplary embodiments of the frame and the extended surface pleated media filter of FIG. 1, illustrating how a second portion of the pleated mechanical filter media interacts with the rear surface of the frame and the door to form an effective seal.

FIGS. 5 and 6 are side cross-sectional and isometric cut-away views of the air cleaner 10, respectively. In particular, FIGS. 5 and 6 illustrate how this exemplary embodiment of the pleated mechanical media filter 220 preferably interacts with the rear wall 130 and the door 170 to provide effective seals between the pleated mechanical media filter 220 and the rear wall 130 and the door 170. FIG. 6 shows a partial cutaway view of the first exemplary collapsible extended surface pleated media filter 200 installed in the frame 100, showing how end portions of the width of the pleated mechanical media filter 220 can be bent or pressed against the rear wall 130 to provide an effective seal.

It should be appreciated that, in the exemplary embodiment shown in FIGS. 1-6, the pleated mechanical media filter 220 has a width $W_f$ that is greater than the length $L_e$ of the end members or structures 210 and the width $W_m$ of the mesh members 230. Additionally, the pleated mechanical media filter 220 is positioned relative to the end members or structures 210 and the mesh members 230 such that the pleated mechanical media filter 220 has first and/or second portions 222 and/or 224 that extend beyond both ends of the end members or structures 210 and the mesh members 230. It should further be appreciated that, in the exemplary embodiment shown in FIGS. 1-6, both the width $W_m$ of the mesh members 230 and the length $L_e$ of the end members or structures 210 are approximately equal to a depth $D_f$ of the frame 100.

Accordingly, as shown in FIGS. 5 and 6, after the first exemplary collapsible extended surface pleated media filter 200 is fully inserted into the frame 100, the first and/or second portions 222 and/or 224 of the pleated mechanical media filter 220 are trapped between the mesh member(s) 230 and the rear wall 130 and/or the door 170, respectively. That is, when the first exemplary collapsible extended surface pleated media filter 200 is fully inserted into the frame 100, the first portion 222 (if present) of the pleated mechanical media filter 220 presses against the rear wall 130, forming an effective seal with the rear wall 130. Likewise, when the door 170 is attached to the frame 100 to close the filter-opening surface 160, the second portion 224 (if present) of the pleated mechanical media filter 220 presses against the door 170, forming an effective seal with the door 170.

It should be appreciated that the first and second portions 222 and 224 may also include a connecting portion, such as a cloth member, that connects an edge of each of the pleats together. The connecting portion(s), if present, typically help create the effective seal(s) between the first and/or second portions 222 and/or 224 and the rear wall 130 or door 170.

It should be appreciated that the term "effective seal" again encompasses exemplary embodiments where, at least for a new, unused first exemplary collapsible extended surface pleated media filter 200, the air flowing from the air inlet surface 140 to the air outlet surface 150 preferentially passes through the pleated mechanical media filter 220, rather than to either side of it. It should be appreciated that term "effective seal" does not necessarily mean that no air flows between the first and/or second portions 222 and/or 224 of the pleated mechanical media filter 220 and the rear wall 130 and/or the door 170.

It should be further appreciated that the term "effective seal" does not require that the pleated mechanical media filter 220 touch the rear wall 130 and/or the door 170. An effective seal can be created between the pleated mechanical media filter 220 and the rear wall 130 and/or the door 170 whenever the pleated mechanical media filter 220 is sufficiently close to the rear wall 130 and/or the door 170, such that a vast majority of the airflow is directed through the pleated mechanical media filter 220 rather than between the pleated mechanical media filter 220 and the rear wall 130 and/or the door 170.

Additionally, the rear wall 130 and/or the door 170 may include a sealing surface or structure provided on the rear wall 130 and/or on the door 170. The sealing surface or structure may be similar to the seal structure previously discussed with regard to the end members or structures 210. If present, the sealing surface or structure typically helps create the effective seal between the first and/or second portions 222 and 224 and the rear wall 130 and/or the door 170.

Figure 7:
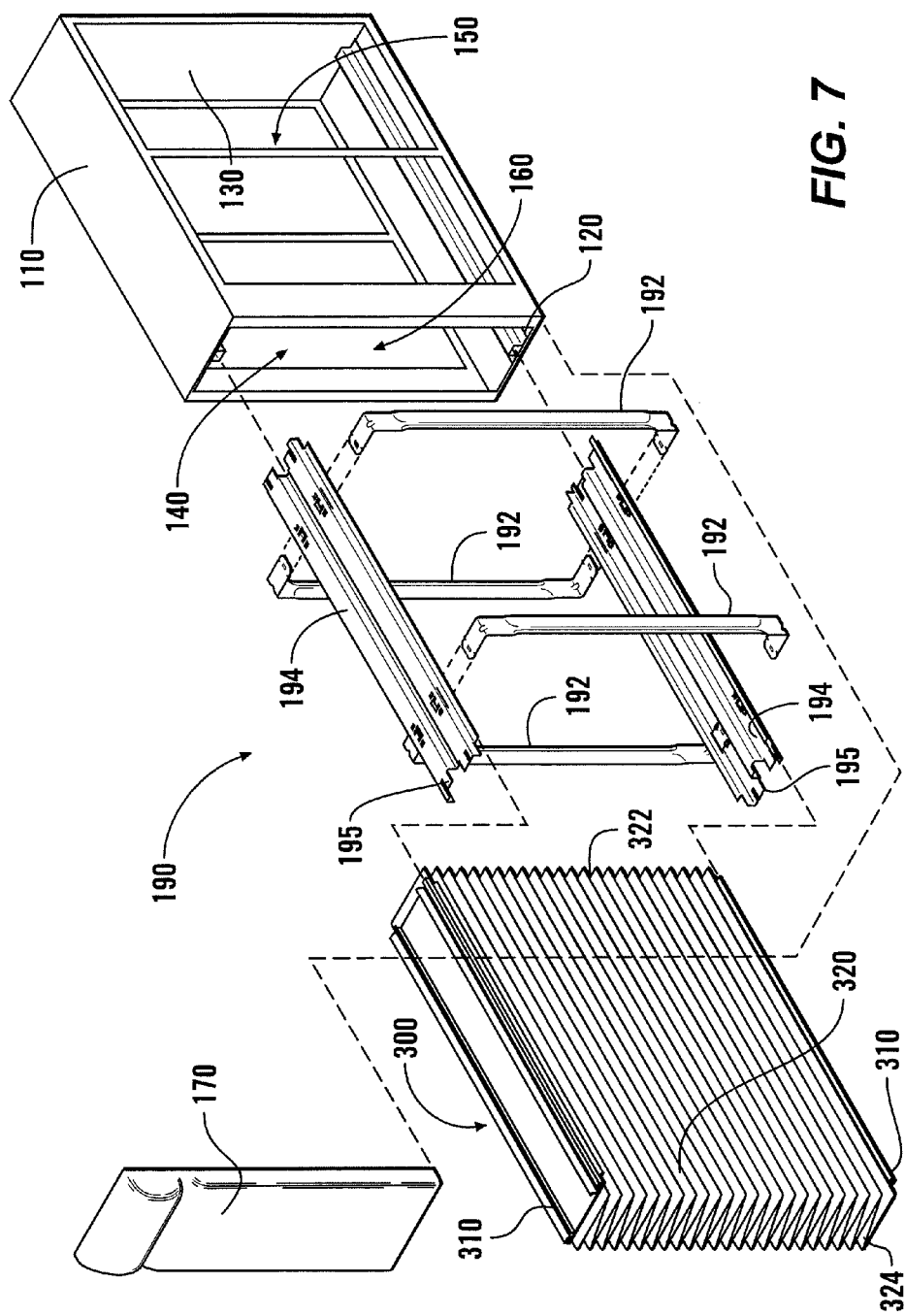
FIG. 7 is an isometric exploded view of a second exemplary embodiment of a frame, a rail system and a second exemplary embodiment of a collapsible extended surface pleated media filter according to this invention.

FIG. 7 shows a second exemplary embodiment of the air cleaner 10, including the frame 100 with an exemplary embodiment of a rail system 190 and a second exemplary collapsible extended surface pleated media filter 300. As shown in FIG. 7, the rail system 190 can be inserted into the frame 100 to provide support structures for the second exemplary collapsible extended surface pleated media filter 300.

It should be appreciated that the rail system 190 may be usable as an upgrade kit to allow the second exemplary collapsible extended surface pleated media filter 300 to be installed in the frame 100 even if the frame 100 was not originally compatible with the second exemplary collapsible extended surface pleated media filter 300.

In the exemplary embodiment shown in FIG. 7, the rail system 190 includes four support arms 192 and two rail guides 194. The support arms 192 and the rail guides 194 can be keyed or otherwise manufactured so that they can only be put together in the desired orientation. The support arms 192 couple with the rail guides 194 to provide an enclosing structure for the second exemplary collapsible extended surface pleated media filter 300. In contrast to the exemplary embodiment shown in FIGS. 1-6, in the exemplary embodiment shown in FIGS. 7-11, the rail system 190 interacts with the frame 100 to provide the enclosing structure.

The rail guides 194 further include flexible tabs 195. The flexible tabs 195 are usable to help hold the rail guides 194 in a fixed position within the frame 100. During installation, the support arms 192 are inserted into slots in the rail guides 194 to provide the generally box-shaped rail system 190. The rail system 190 is inserted into the frame 100 and one or more of the flexible tabs 195 on one or more of the rail guides 194 are bent towards the frame 100. By bending one or more of the flexible tabs 195 toward the frame 100, the one or more flexible tabs 195 will prevent the rail system 190 from being inadvertently removed from the frame 100. It should be appreciated that the rail guides 194 may include multiple flexible tabs 195 of different lengths. The different lengths of the various flexible tabs 195 may be usable to install the same rail system 190 into different frames 100 with different internal dimensions.

As shown in FIG. 7, the second exemplary collapsible extended surface pleated media filter 300, when in the extended or open state, is insertable into the rail system 190 such that the second exemplary collapsible extended surface pleated media filter 300 extends between the rail guides 194 and between the rear wall 130 and the filter-opening surface 160 of the frame 100.

Figure 8:
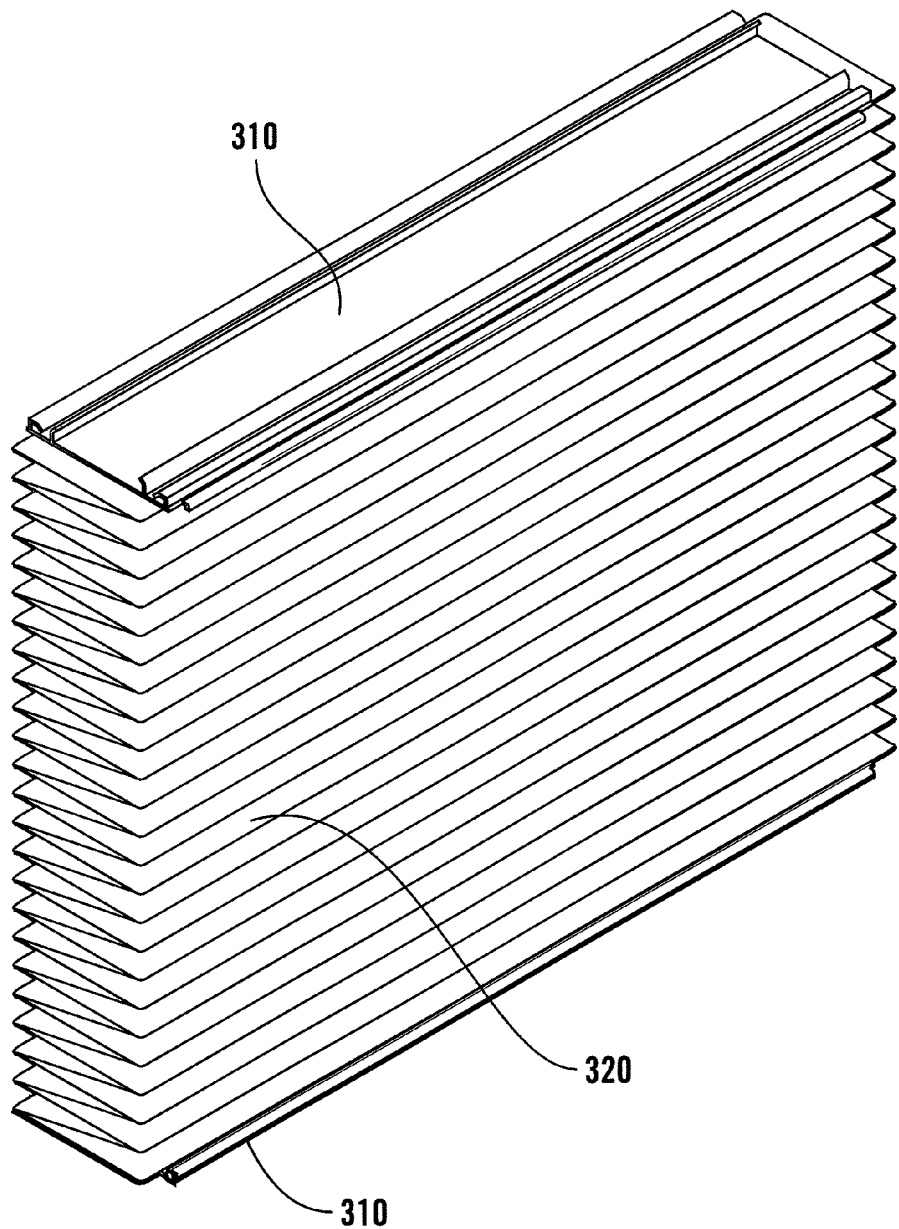
FIG. 8 is an isometric view of the second exemplary embodiment of the extended surface pleated media filter of FIG. 7.

FIG. 8 is an isometric view of the second exemplary collapsible extended surface pleated media filter 300 shown in FIG. 7. As shown in FIG. 8, the second exemplary collapsible extended surface pleated media filter 300 includes a set of end members or structures 310 and an extendible pleated mechanical media filter 320. It should be appreciated that the second exemplary collapsible extended surface pleated media filter 300 may also include structures similar to the flexible support member 230 and the pleat spacer members 240 of the first exemplary collapsible extended surface pleated media filter 200 shown in FIG. 2.

Figure 9:
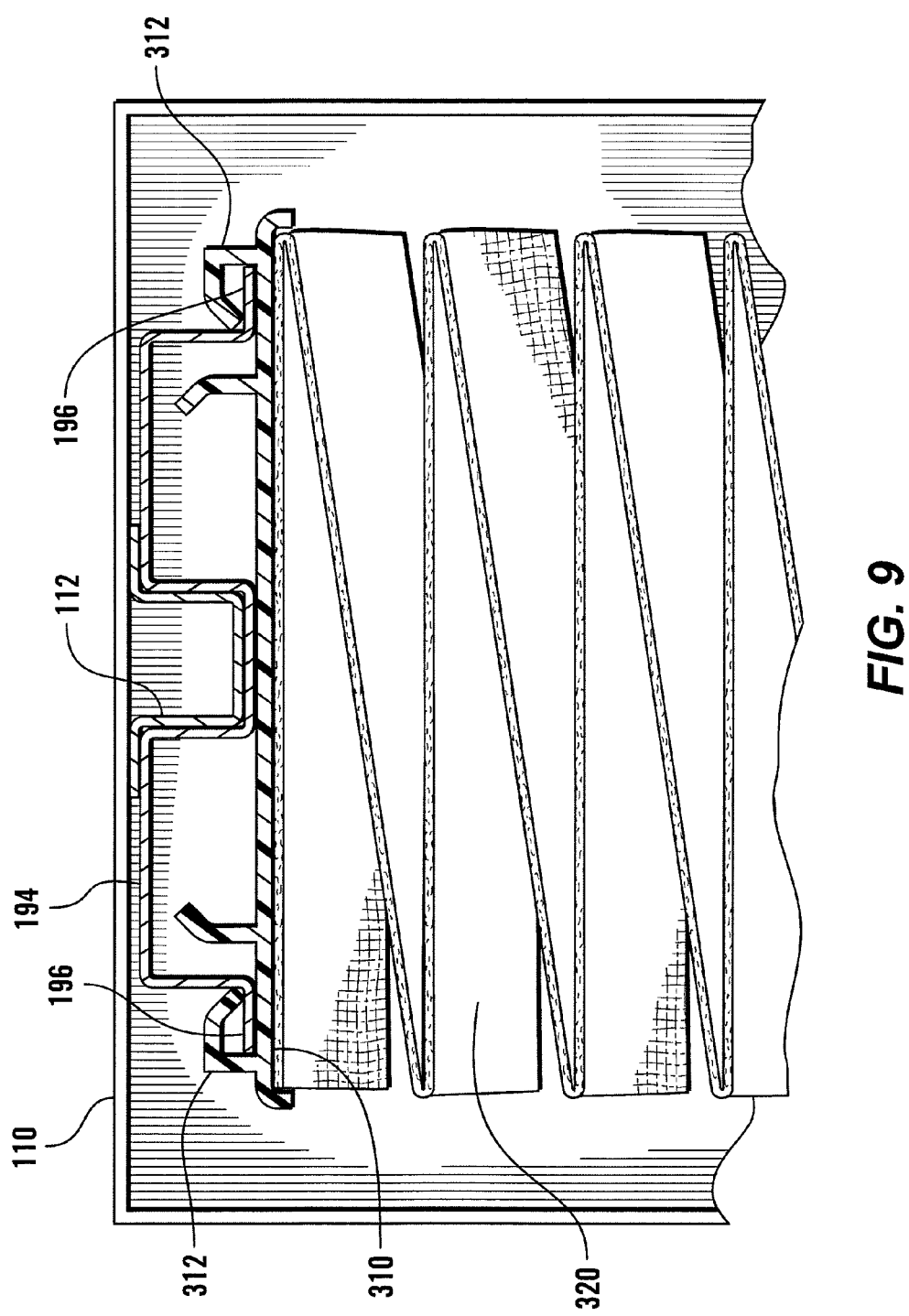
FIG. 9 is a front plan view of the second exemplary embodiments of the frame and the extended surface pleated media filter of FIG. 7 showing the support members of the frame and the end members of the extended surface pleated media filter.

FIG. 9 is a front cross-sectional view of the rail system 190 and the second exemplary collapsible extended surface pleated media filter 300 installed in the frame 100 showing the interactions between one of the rail guides 194 of the rail system 190, the top wall 110 of the frame 190 and one of the end members or structures 310 of the second exemplary collapsible extended surface pleated media filter 300. As shown in FIG. 9, the rail guide 194 interacts with a rib 112 on the top wall 110 of the frame 100. Likewise, another rail guide 194 may interact with a similar rib on the bottom wall 120 of the frame 100. The rib 112 helps hold the rail system 190 in a fixed position relative to the frame 100. The end members or structures 310 include feet 312 that interact with edges 196 of the rail guides 194. The feet 312 and the edges 196 help hold the second exemplary collapsible extended surface pleated media filter 300 in a fixed position relative to the rail system 190, and thus the frame 100. The feet 312, the edges 196, the top and/or bottom walls 110 and/or 120 and/or other structures of the end members or structures 310 or rail system 190 may also help provide an effective seal between the end members or structures 310 and the top and/or bottom walls 110 and/or 120 by helping provide a tortuous path between the end members or structures 310 and the top and/or bottom walls 110 and/or 120.

Figure 10:
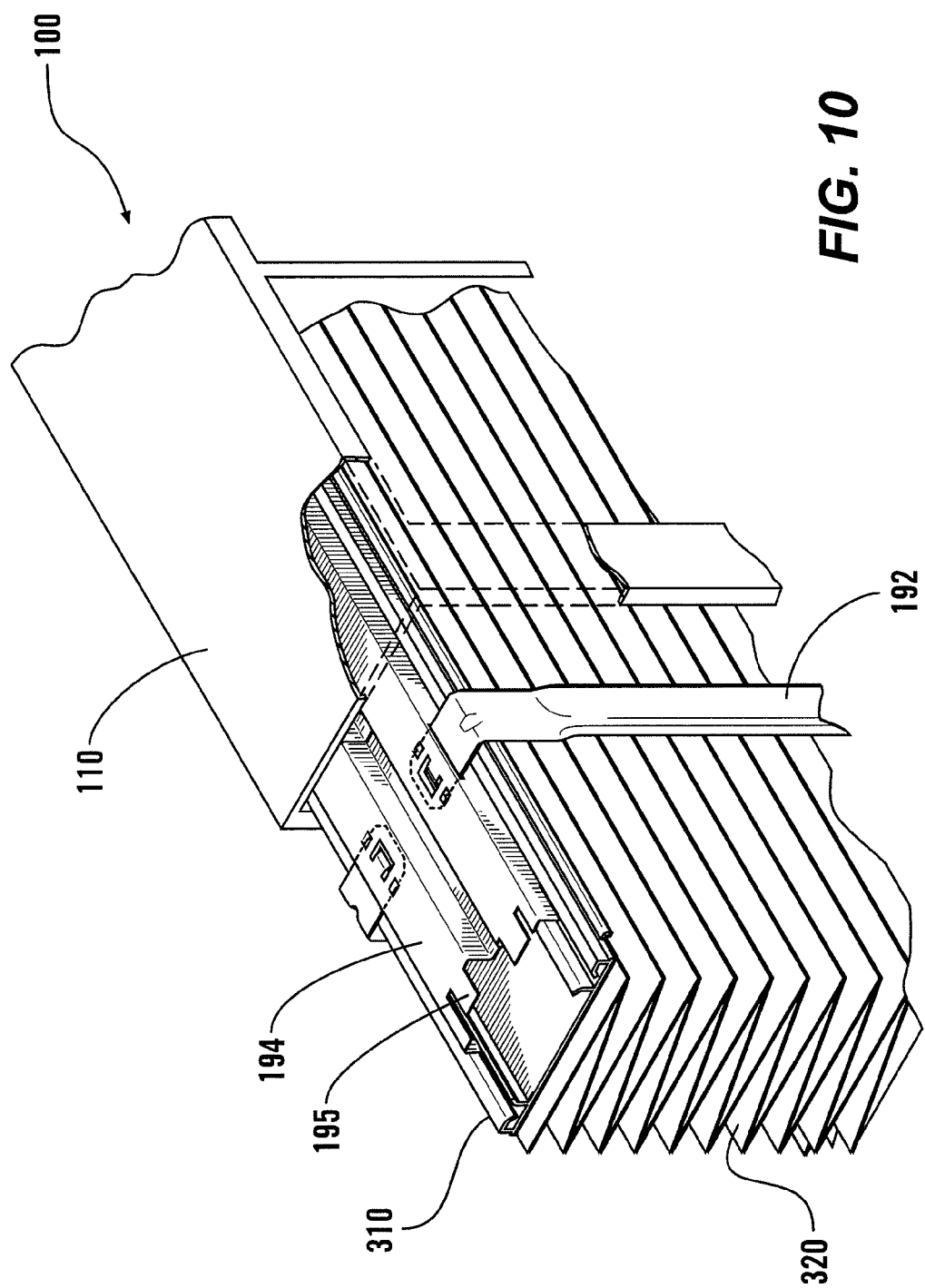
FIG. 10 is an isometric view of the second exemplary embodiment of the frame, the rail system and the second exemplary embodiment of the collapsible extended surface pleated media filter shown in FIG. 7.

FIG. 10 shows the second exemplary collapsible extended surface pleated media filter 300 being installed into the frame 100. It should be appreciated that FIG. 10 shows the rail system 190 pulled out from the frame 100 to better show the interactions between the frame 100, the rail system 190 and the second exemplary collapsible extended surface pleated media filter 300. In general, the rail system 190 will be installed into the frame 100 separately from the second exemplary extended surface pleated media filter 300 and will not be removed/replaced with subsequent removal/replacement of the second exemplary collapsible extended surface pleated media filter 300.

Figure 11:
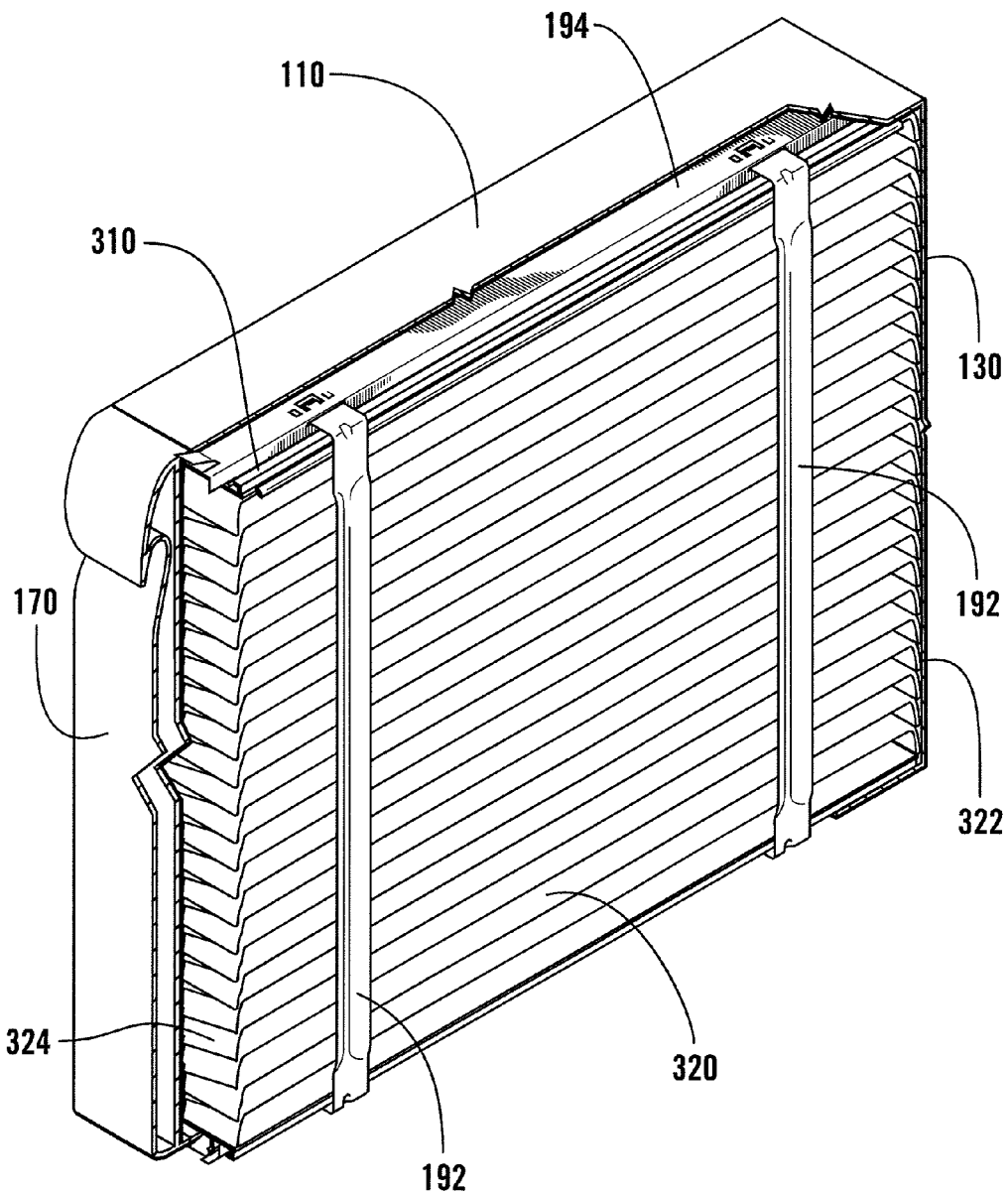
FIG. 11 is an isometric cutaway view of the second exemplary embodiment of the frame, the rail system and the second exemplary embodiment of the collapsible extended surface pleated media filter shown in FIG. 7.

FIG. 11 shows an isometric cutaway view of the second exemplary collapsible extended surface pleated media filter 300 installed into the rail system 190 and the frame 100. As shown in FIG. 11, the pleated mechanical media filter 320 of the second exemplary collapsible extended surface pleated media filter 300 includes first and/or second portions 322 and/or 324 that interact with the rear wall 130 and/or the door 170 of the frame 100 in a similar manner as the first and/or second portions 222 and/or 224 of the first exemplary collapsible extended surface pleated media filter 200 shown in FIGS. 1-6.

As shown in FIG. 11, after the second exemplary collapsible extended surface pleated media filter 300 is fully inserted into the frame 100, the first and/or second portions 322 and/or 324 of the pleated mechanical media filter 320 are pressed against the rear wall 130 and/or the door 170. It should be appreciated that, if the pleated mechanical media filter 320 includes structures similar to the flexible support member(s) 230 of the first exemplary collapsible extended surface pleated media filter 200, the first and/or second portions 322 and/or 324 may be further forced toward the back wall 130 and/or door 170 by such structures. As such, when the second exemplary collapsible extended surface pleated media filter 300 is fully inserted into the frame 100, the first portion 322 (if present) of the pleated mechanical media filter 320 presses against the rear wall 130, forming an effective seal with the rear wall 130. Likewise, when the door 170 is attached to the frame 100 to close the filter-opening surface 160, the second portion 324 (if present) of the pleated mechanical media filter 320 presses against the door 170, forming an effective seal with the door 170.

It should be appreciated that the first and second portions 322 and 324 may also include a connecting portion, such as a cloth member, that connects an edge of each of the pleats together. The connecting portion(s), if present, typically help create the effective seal(s) between the first and/or second portions 322 and/or 324 and the rear wall 130 or door 170.

Figure 12:
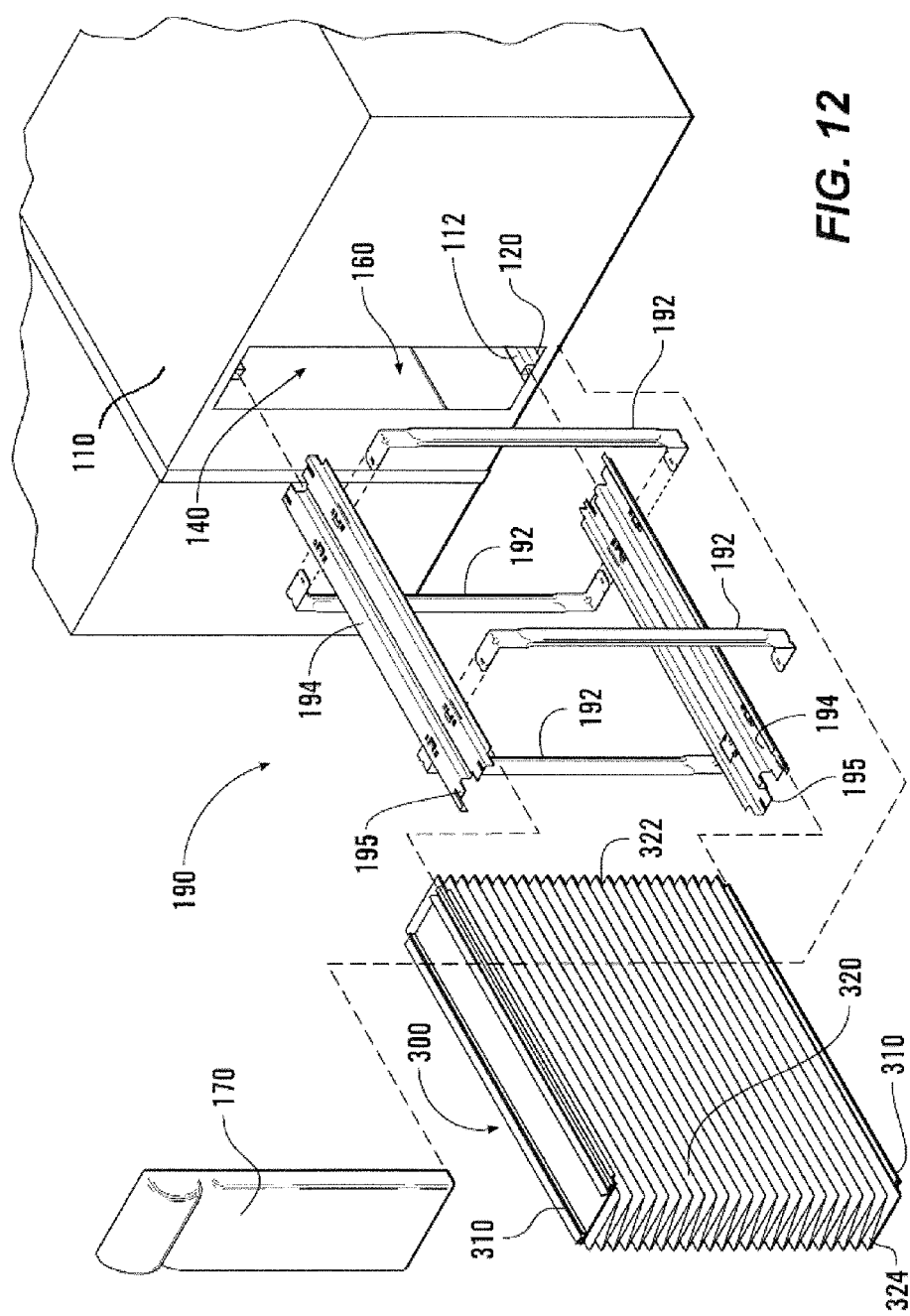
FIG. 12 is an isometric view of a segment of ductwork and the rail system and second exemplary embodiment of the collapsible extended surface pleated media filter shown in FIG. 7.

FIG. 12 shows the second exemplary collapsible extended surface pleated media filter 300 and the rail system 190 being inserted into a segment of ductwork. In the embodiment shown in FIG. 12, the walls of the ductwork are usable as the top wall 110, the bottom wall 120 and the rear wall 130 (not shown). Likewise, the door 170 may be at least partially formed from a portion of the ductwork. It should be appreciated that the rib(s) 112 may be elements of the ductwork or may be separate elements coupled with the ductwork (e.g., welded to the ductwork, bolted to the ductwork, etc.) and may be any known or later-developed element or structure that is usable to keep the rail system 190 in a substantially fixed location relative to the segment of ductwork. As shown in FIG. 12, an existing or new segment of ductwork may be used as an enclosing structure for the collapsible extended surface pleated media filter 200 or 300. In one exemplary embodiment, a hole is cut into an existing segment of ductwork to provide the filter-opening surface 160.

The preceding detailed description discussed exemplary embodiments where the flexible support members, when provided, are implemented as mesh members. It should be appreciated that any known or later developed device, structure and/or material that can appropriately support the pleated mechanical filter media at least in the extended or open state and which is sufficiently flexible to allow the collapsible extended surface pleated media filter to be altered between a collapsed state and the extended state a plurality of times may be used as the flexible support members. For example, as outlined above, the flexible support members may alternatively be implemented as long, relatively narrow strips formed of a flexible material. Additionally, the pleated mechanical media filter may be formed using appropriate materials such that the pleated mechanical media filter is stiff enough to maintain the desired shape without the need of a support structure. Alternatively, a support structure may be incorporated into the enclosing structure. Such a support structure could include one or more support beams located between two or more surfaces of the enclosing structure, to provide support for the pleated mechanical media filter.

It should also be appreciated that, if one or more flexible support members are implemented as one or more mesh members, only one mesh member may be used, and that mesh member may be placed adjacent to one side of the pleated mechanical filter media or embedded within the pleated mechanical filter media. It should further be appreciated that the pleated mechanical filter media may extend beyond only one end of the end members/structures and/or the flexible support member(s). It should also be appreciated that the pleated mechanical filter media can have any desired thickness.

It should be appreciated that any known or later-developed technique can be used to embed one or more flexible support members in the pleated mechanical filter media. For example, the flexible support member can be embedded by forming the pleated mechanical filter media using two layers of filter material, with the flexible support member located between the two layers. It should also be appreciated that the flexible support members are optional, and may be omitted entirely. Thus, it should be appreciated that the particular set of end members/structures, flexible support members and pleated mechanical filter media described in the preceding exemplary embodiments are illustrative only.

Similarly, it should be appreciated that the flexible support members, if implemented, can be formed of any known or later-developed material that has the desired stiffness, including metals, whether single element metals or alloys, synthetic fibers, natural fibers or the like. It should be appreciated that the flexible support members can be provided on one or both sides of the pleated mechanical media filter, and/or can be embedded within the pleated mechanical media filter.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A filter for an existing air cleaner housing having a first support member oriented about a first axis and provided substantially along a first wall of said air cleaner housing, the filter comprising:
   a filter media extending between a first end member and a second end member;
   the first end member having a first end projection comprising a first portion that projects out from the first end member; and
   wherein the first end member and the second end member are moveable relative to each other to engage the first end projection and said first support member and expand the filter media in a direction transverse to said first axis.

2. The filter of claim 1, wherein the first portion of the first end projection, a first end foot coupled to the first portion, and a first end member surface help define a first end retaining channel adapted to engage said first support member provided in said existing air cleaner housing.

3. The filter of claim 1, wherein the filter media is pleated.

4. The filter of claim 3, further comprising at least one pleat spacer member coupled to pleats of the filter media, the first end member and/or second end member.

5. The filter of claim 1, further comprising at least one a flexible support member coupled to the filter media, the first end member and/or second end member.

6. The filter of claim 1, wherein the filter is adapted to create an effective seal between the first end member and said first support member.

7. A filter for an air cleaner housing having a first wall and a first support structure provided substantially along said first wall and defining a space between said first support structure and said first wall, and an opposing second wall and a second support structure provided in said air cleaner housing adjacent said opposing second wall, the filter comprising:
   a filter media extending between a first end member and a second end member;
   wherein the filter media is adapted to be expanded to an extended state by separating the first end member and the second end member to engage a first projection of the first end member and said first support structure provided in said air cleaner housing in said space between said first support structure and said first wall.

8. The filter of claim 7, wherein the filter media is adapted to be supported in an extended state in said air cleaner housing by moving the first end member and the second end member apart to respectively engage said first support structure and said second support structure.

9. The filter of claim 7, wherein the first end member comprises a surface coupled to the first end of the filter media, and an opposing surface, and wherein the first projection is coupled to the opposing surface of the first end member and comprises a first portion that projects away from the opposing surface.

10. The filter of claim 9, wherein the first projection further comprises a foot coupled to the first portion, and wherein the first portion, the foot, and the opposing surface of the first end member help define a first end retaining channel adapted to engage said first support structure.

11. The filter of claim 7, wherein the filter media is pleated.

12. The filter of claim 11, further comprising at least one pleat spacer member coupled to pleats of the filter media, the first end member and/or the second end member.

13. The filter of claim 7, further comprising a flexible support member coupled to the filter media, the first end member and/or the second end member.

14. The filter of claim 8, wherein the filter is adapted to create an effective seal between the first end member and said first support structure.

15. A filter for an air cleaner housing having a first support structure provided substantially along a first wall of said air cleaner housing and defining a space between said first support structure and said first wall, and a second support structure provided adjacent a second wall of said air cleaner housing, the filter comprising:
- a filter media having a first end and a second end;
- a first end member having first and second opposing surfaces, wherein the first opposing surface of the first end member is coupled to the first end of the filter media, and the first end member having a first end foot having a first portion that projects from the second opposing surface of the first end member; and
- a second end member having first and second opposing surfaces, wherein the first opposing surface of the second end member is coupled to the second end of the filter media, and the second end member having a second member projecting from the second opposing surface of the second end member;
- wherein the first end foot is adapted to engage said first support structure in said space.

16. The filter of claim 15, wherein the first end member and the second end member are adapted to move relative to each other to respectively engage said first support structure and said second support structure of said existing air cleaner housing.

17. The filter of claim 15, wherein the filter media is pleated.

18. The filter of claim 17, further comprising at least one pleat spacer member coupled to pleats of the filter media, the first end member and/or the second end member.

19. The filter of claim 15, further comprising a flexible support member coupled to the filter media, the first end member and/or the second end member.

20. The filter of claim 15, wherein the filter is adapted to create an effective seal between the first end member and said first support structure.

* * * * *